(12) United States Patent
Kim et al.

(10) Patent No.: US 10,321,429 B2
(45) Date of Patent: Jun. 11, 2019

(54) MOBILE TERMINAL AND METHOD FOR CONTROLLING THE SAME

(71) Applicant: LG ELECTRONICS INC., Seoul (KR)

(72) Inventors: Yoonkyum Kim, Seoul (KR); Taebong Kim, Seoul (KR); Yongsuk Lee, Seoul (KR); Jinhoon Kim, Seoul (KR); Sungzoon Yang, Seoul (KR); Baekju Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 152 days.

(21) Appl. No.: 15/433,679

(22) Filed: Feb. 15, 2017

(65) Prior Publication Data

US 2017/0245198 A1    Aug. 24, 2017

Related U.S. Application Data

(60) Provisional application No. 62/297,154, filed on Feb. 19, 2016.

(30) Foreign Application Priority Data

Jan. 25, 2017  (KR) .................. 10-2017-0012186

(51) Int. Cl.
*H04W 64/00*       (2009.01)
*H04W 4/02*        (2018.01)
(Continued)

(52) U.S. Cl.
CPC ........... *H04W 64/006* (2013.01); *H04W 4/02* (2013.01); *H04W 8/02* (2013.01); *H04W 48/16* (2013.01); *H04W 48/18* (2013.01); *H04W 84/042* (2013.01)

(58) Field of Classification Search
CPC ... H04W 48/18; H04W 48/16; H04W 84/042; H04W 8/02
(Continued)

(56) References Cited

U.S. PATENT DOCUMENTS 9,606,216 B2 *   3/2017  Joe .......................... G01S 5/02
2004/0152462 A1 *  8/2004  Hwang ................. H04W 48/18
                                                     455/432.1

(Continued)

FOREIGN PATENT DOCUMENTS

KR    10-2013-0128777 A    11/2013
KR    10-2013-0137423 A    12/2013
KR    10-2015-0119292 A    10/2015

*Primary Examiner* — Jaime M Holliday
(74) *Attorney, Agent, or Firm* — Birch, Stewart, Kolasch & Birch, LLP

(57) ABSTRACT

The present invention relates to a mobile terminal and a method for controlling the same, the mobile terminal including a location information module configured to acquire location information related to the mobile terminal based on one of a first positioning method that is configured to detect access points (APs) adjacent to the mobile terminal, receive location information related to the detected APs, and acquire the location information on the mobile terminal based on the received location information related to the APs, and a second positioning method that is configured to receive location information related to the detected APs and other APs located within a predetermined area where the detected APs are located, and acquire the location information on the mobile terminal based on the received location information related to the APs, a communication unit configured to perform wireless communication with a first positioning server providing first AP information including the location information related to the detected APs or a second positioning server providing second AP information including the location information related to the detected APs and the (Continued)

other APs located within the predetermined area where the detected APs are located, a memory configured to store the first AP information or the second AP information, and a controller configured to perform a process of acquiring the location information on the mobile terminal according to the second positioning method for a preset time when the APs located adjacent to the mobile terminal are detected, and acquire the location information on the mobile terminal according to the first positioning method when the location information on the mobile terminal is not acquired for the preset time.

15 Claims, 8 Drawing Sheets

(51) Int. Cl.
    *H04W 84/04*    (2009.01)
    *H04W 8/02*    (2009.01)
    *H04W 48/18*    (2009.01)
    *H04W 48/16*    (2009.01)

(58) Field of Classification Search
    USPC .............................................. 455/456.1–457
    See application file for complete search history.

(56) References Cited

U.S. PATENT DOCUMENTS

| 2014/0235280 | A1* | 8/2014 | Edge | ..................... | H04W 48/16 |
| | | | | | 455/456.6 |
| 2014/0279501 | A1* | 9/2014 | Kumar | ............... | G06Q 20/3224 |
| | | | | | 705/44 |
| 2014/0370909 | A1* | 12/2014 | Natucci, Jr. | ....... | H04W 52/0251 |
| | | | | | 455/456.1 |

* cited by examiner

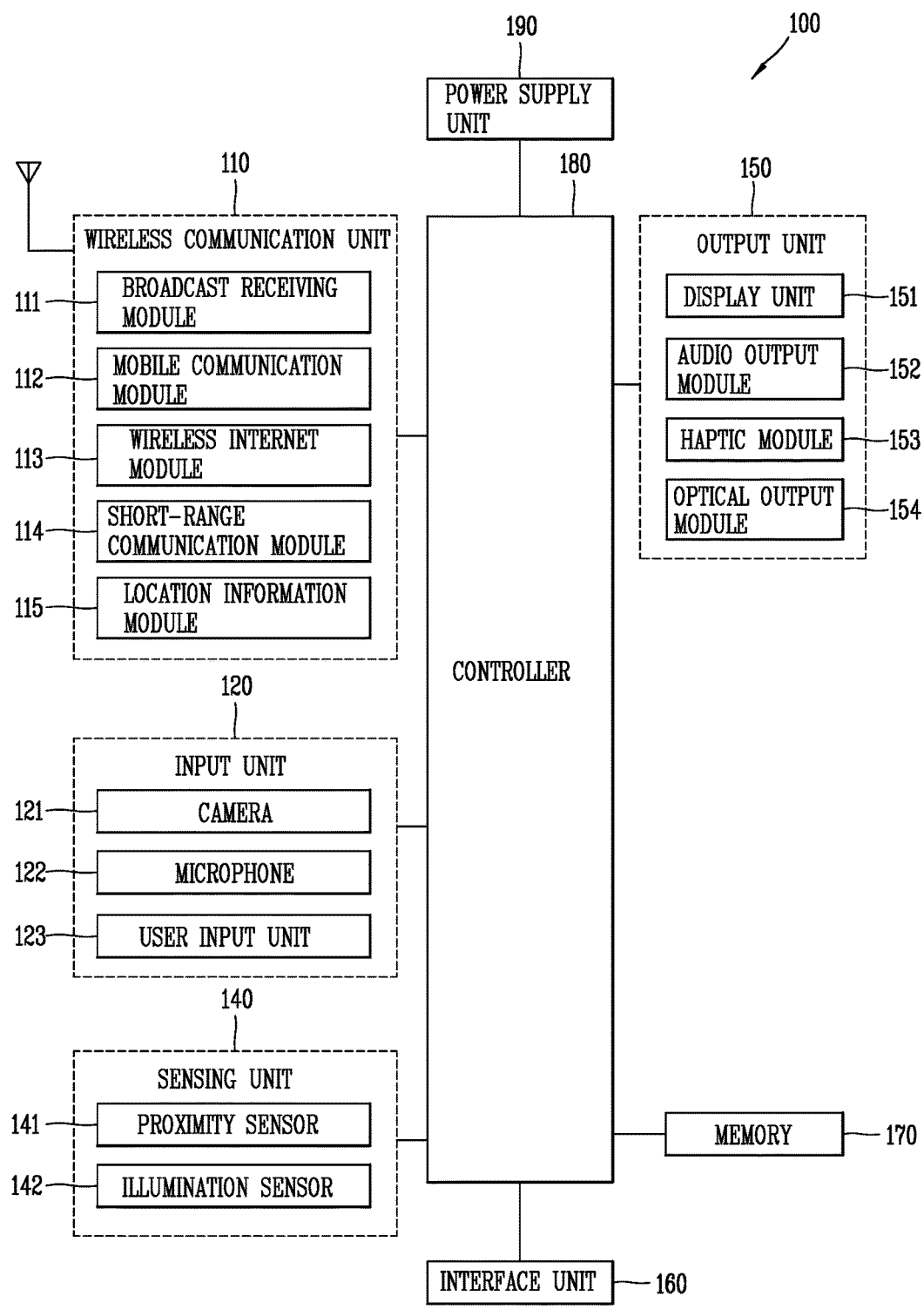

MOBILE TERMINAL AND METHOD FOR CONTROLLING THE SAME

CROSS-REFERENCE TO RELATED APPLICATION

Pursuant to 35 U.S.C. § 119(a), this application claims the benefit of an earlier filing date of and the right of priority to U.S. Application No. 62/297,154, filed on Feb. 19, 2016, and KR Application No. 10-2017-0012186, filed on Jan. 25, 2017, the contents of which are incorporated by reference herein in its entirety.

BACKGROUND OF THE INVENTION

1. Field of the Invention

The present invention relates to a mobile terminal and a method for controlling the same.

2. Background of the Invention

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player. Efforts are ongoing to support and increase the functionality of mobile terminals. Such efforts include software and hardware improvements, as well as changes and improvements in the structural components.

With development of technologies, terminals are provided with various functions. For example, a current terminal can be provided with a positioning function of calculating a current location and executing various functions according to the calculated location. Also, the current terminal has tendency of being developed to execute more other functions utilizing such positioning function.

On the other hand, such a positioning function can be achieved through triangulation using signals originated from three or more global positioning system (GPS) satellites. However, a GPS positioning method using the GPS satellite signal has a problem that positioning is difficult when the mobile terminal is located in a room where it is difficult to receive the satellite signal. Also, since the mobile terminal should transmit and receive signals with the GPS satellite, power consumption increases.

In order to solve these problems, a network positioning method for performing positioning using WiFi Access Points (APs) located near the mobile terminal has appeared. Nowadays, in order to calculate the location of the mobile terminal through such a network positioning method, researches are actively conducted to lower the power consumption and to detect (find) the location of the mobile terminal more accurately.

SUMMARY OF THE INVENTION

Therefore, an aspect of the detailed description is to solve the above-described problems and other problems, namely, to provide a mobile terminal capable of less consuming power even with maintaining detection accuracy when detecting (finding) its location using a network positioning method, and a method for controlling the same.

Another aspect of the present invention is to provide a mobile terminal capable of performing positioning by a more efficient network positioning method according to an area where the mobile terminal is located, and a method for controlling the same.

To achieve these and other advantages and in accordance with the purpose of this specification, as embodied and broadly described herein, there is provided a mobile terminal, including a location information module configured to acquire location information related to the mobile terminal based on one of a first positioning method that is configured to detect access points (APs) adjacent to the mobile terminal, receive location information related to the detected APs, and acquire the location information on the mobile terminal based on the received location information related to the APs, and a second positioning method that is configured to receive the location information related to the detected APs and other APs located within a predetermined area where the detected APs are located, and acquire the location information on the mobile terminal based on the received location information related to the APs, a communication unit configured to perform wireless communication with a first positioning server providing first AP information including the location information related to the detected APs or a second positioning server providing second AP information including the location information related to the detected APs and the other APs located within the predetermined area where the detected APs are located, a memory configured to store the first AP information or the second AP information, and a controller configured to perform a process of acquiring the location information on the mobile terminal according to the second positioning method for a preset time when the APs located adjacent to the mobile terminal are detected, and acquire the location information on the mobile terminal according to the first positioning method when the location information on the mobile terminal is not acquired for the preset time.

In one embodiment disclosed herein, the controller may receive the second AP information further including the location information related to the other APs within the predetermined area where the detected APs are located from the second positioning server and acquire the location information on the mobile terminal based on the received second AP information, when the location information related to the detected APs is not included in prestored second AP information in case where the location information on the mobile terminal is acquired according to the second positioning method. The controller may receive the first AP information including the location information related to the detected APS from the first positioning server and acquire the location information on the mobile terminal based on the received first AP information, when the location information corresponding to the detected APs is not included in prestored first AP information in case where the location information on the mobile terminal is acquired according to the first positioning method.

In one embodiment disclosed herein, the controller may store the received second AP information as the prestored second AP information, when the second AP information further including the location information related to the other APs within the predetermined area where the detected APs are located is received from the second positioning server while acquiring the location information on the mobile terminal according to the first positioning method, after a lapse of the preset time.

In one embodiment disclosed herein, the preset time may be decided according to a time required for detecting whether or not the prestored second AP information includes the location information corresponding to the detected APs.

In one embodiment disclosed herein, the controller may determine whether or not the location information on the mobile terminal can be acquired according to the second positioning method for the preset time when the APs located adjacent to the mobile terminal are detected, and acquire the location information on the mobile terminal according to one of the second positioning method or the first positioning method based on the determination result.

In one embodiment disclosed herein, the controller may determine whether or not the location information on the mobile terminal can be acquired according to the second positioning method, on the basis of whether or not the prestored second AP information includes the location information corresponding to the detected APs, and whether or not the second AP information further including the location information related to the other APs within the predetermined area where the detected APs are located is received within the preset time.

In one embodiment disclosed herein, the first positioning server may be a server having an AP database including location information and inherent information related to APs collected by an operating system provider providing an operating system of the mobile terminal, and the second positioning server may be a server having an AP database including location information and inherent information related to APs collected by a manufacturer of the mobile terminal or a chipset equipped in the mobile terminal.

In one embodiment disclosed herein, the memory may further store information in which one of the first positioning method, the second positioning method, a third positioning method of acquiring one of location information according to results of simultaneously performing the first and second positioning methods, and a fourth positioning method of first performing the second positioning method for a preset time and acquiring the location information on the mobile terminal according to the first positioning method when the location information is not acquired within the preset time is set to correspond to each area. The controller may identify an area where the mobile terminal is located when the located area of the mobile terminal changes, and change a network positioning method of the mobile terminal based on the information related to the positioning method set for each area and the identification result.

In one embodiment disclosed herein, the controller may detect the change in the located area of the mobile terminal and identify the located area of the mobile terminal, based on location information acquired by a global positioning system (GPS) positioning method.

In one embodiment disclosed herein, the controller may determine the change in the located area of the mobile terminal according to occurrence or non-occurrence of overseas roaming of the mobile terminal. The controller may identify the located area of the mobile terminal based on a public land mobile network (PLMN) ID received from a visited network accessed in response to the overseas roaming when the overseas roaming occurs.

In one embodiment disclosed herein, the controller may determine the change in the located area of the mobile terminal according to occurrence or non-occurrence of overseas roaming of the mobile terminal. The controller may identify the located area of the mobile terminal from a string of a message for notifying the occurrence of the overseas roaming to a user when the overseas roaming occurs.

In one embodiment disclosed herein, the controller may decide one of the second positioning method or the fourth positioning method as the network positioning method of the mobile terminal when the mobile terminal is located in a specific area according to the identification result of the located area of the mobile terminal. The controller may decide one of the first positioning method or the third positioning method as the network positioning method of the mobile terminal when the mobile terminal is located in an area other than the specific area.

To achieve these and other advantages and in accordance with the purpose of this specification, as embodied and broadly described herein, there is provided a method for controlling a mobile terminal, the method including detecting access points (APs) adjacent to the mobile terminal, acquiring location information on the mobile terminal according to a second positioning method of receiving prestored second AP information including location information related to the detected APs and other APs located within a predetermined area where the detected APs are located from a preset second positioning server for a preset time, and acquiring the location information on the mobile terminal based on the second AP information, detecting whether or not the location information on the mobile terminal has been acquired for the preset time, and acquiring the location information on the mobile terminal according to a first positioning method of receiving the location information related to the detected APs from a preset first positioning server and acquiring the location information on the mobile terminal based on the received location information when the location information has not been acquired according to the detection result.

In one embodiment disclosed herein, the acquiring the location information according to the second positioning method for the preset time may include detecting whether or not the prestored second AP information includes the location information related to the detected APs, and receiving new second AP information further including the location information related to the other APs within a predetermined area where the detected APs are located from the second positioning server according to the detection result. The detecting whether or not the location information has been acquired for the preset time may further include determining that the location information has been acquired for the preset time according to whether or not the prestored second AP information includes the location information related to the detected APs or whether or not the new second AP information has been received for the preset time.

In one embodiment disclosed herein, the method may further include, prior to detecting the APs adjacent to the mobile terminal, identifying an area according to the location of the mobile terminal, and changing a network positioning method of the mobile terminal, according to the identified area, into one of the first positioning method, the second positioning method, a third positioning method of acquiring one of the location information according to results of simultaneously performing the first and second positioning methods, and a fourth positioning method including detecting the APs, acquiring the location information according to the second positioning method, detecting whether or not the location information has been acquired for the preset time, and acquiring the location information by the first positioning method according to the detection result.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a block diagram of a mobile terminal in accordance with one exemplary embodiment of the present invention;

DETAILED DESCRIPTION OF THE INVENTION

Figure 2A:
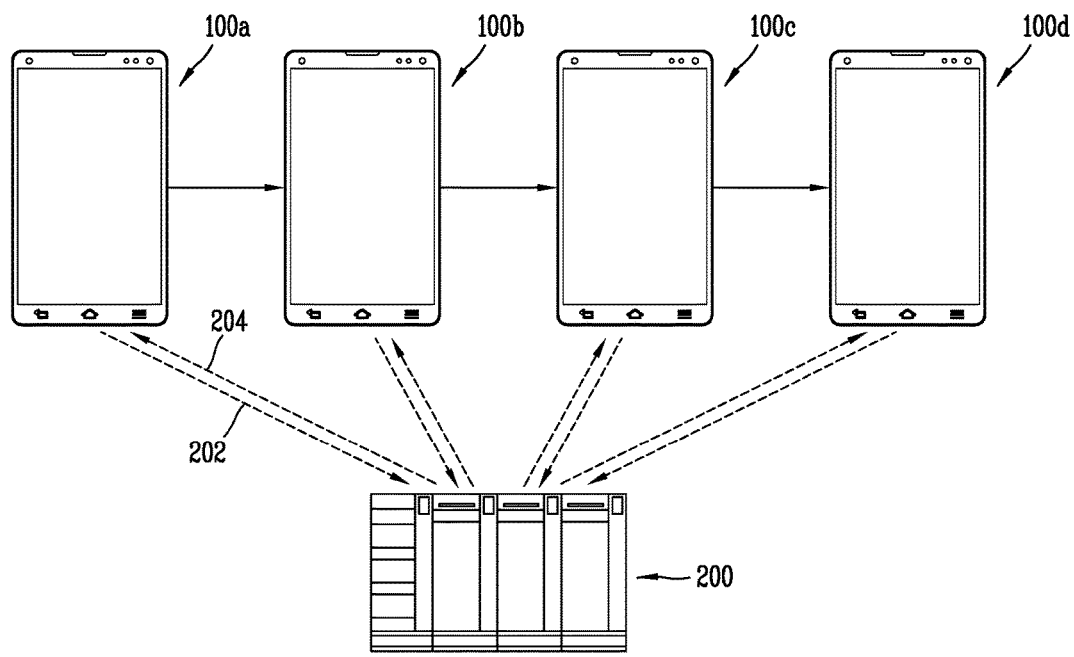
FIGS. 2A to 2C are conceptual views illustrating network positioning methods executable in a mobile terminal in accordance with the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

First, FIG. 1 is a block diagram illustrating a mobile terminal 100 in accordance with the present invention.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a location of the mobile terminal may be acquired using a signal sent from a GPS satellite. As another example, when the mobile terminal uses the Wi-Fi module, a location of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the location of the mobile terminal. The location information module 115 is a module used for acquiring the position (or the current position) and may not be limited to a module for directly calculating or acquiring the location of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

According to the above description, the WiFi module of the location information module 115 according to the embodiment of the present invention is configured to acquire a location of the mobile terminal 100 based on information related to a wireless access point (AP) which transmits or receives a wireless signal with the WiFi module. Accordingly, in order to calculate the location of the mobile terminal 100 using the network positioning method, the mobile terminal 100 needs information related to APs scanned in the mobile terminal 100 and locations of the scanned APs.

Meanwhile, the information related to the APs and the locations of the APs may be information that is generally collected in a cloud sourcing manner. For example, mobile terminal users can participate in a cloud sourcing work, and collect information related to APs that have been detected (searched) around the mobile terminal. The collected information may be processed into a form of big data to generate an AP database. Meanwhile, a provider providing a network positioning service may provide the network positioning service of the mobile terminal 100 by providing positioning information using the generated AP database.

On the other hand, since the mobile terminal 100 is a simplified and lightweight terminal for movement, it generally has a limited storage capacity for portability. Accordingly, it is impossible to store information related to APs in an entire area and locations of the APs, and it is very inefficient. Accordingly, the provider providing the network positioning service receives from the mobile terminal 100 information related to adjacent APs scanned by the mobile terminal 100 and wireless signals sensed from the APs, and provides information related to the received information based on the AP database, thereby detecting the location of the mobile terminal 100.

Figure 2B:
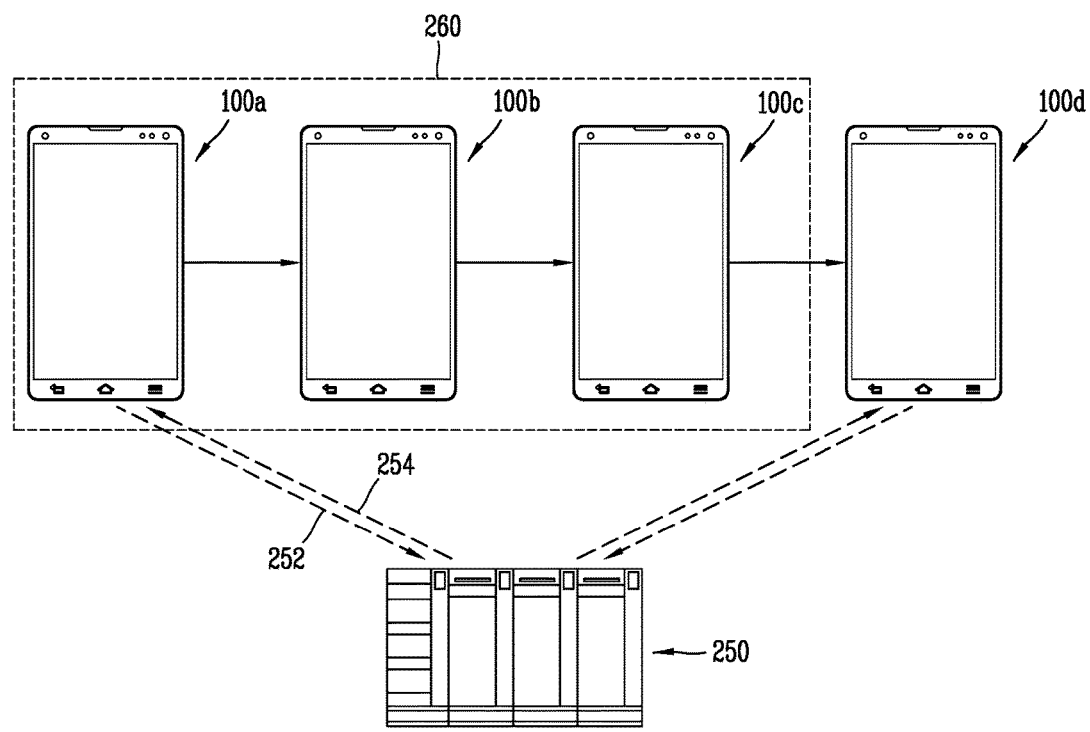
Figure 2C:
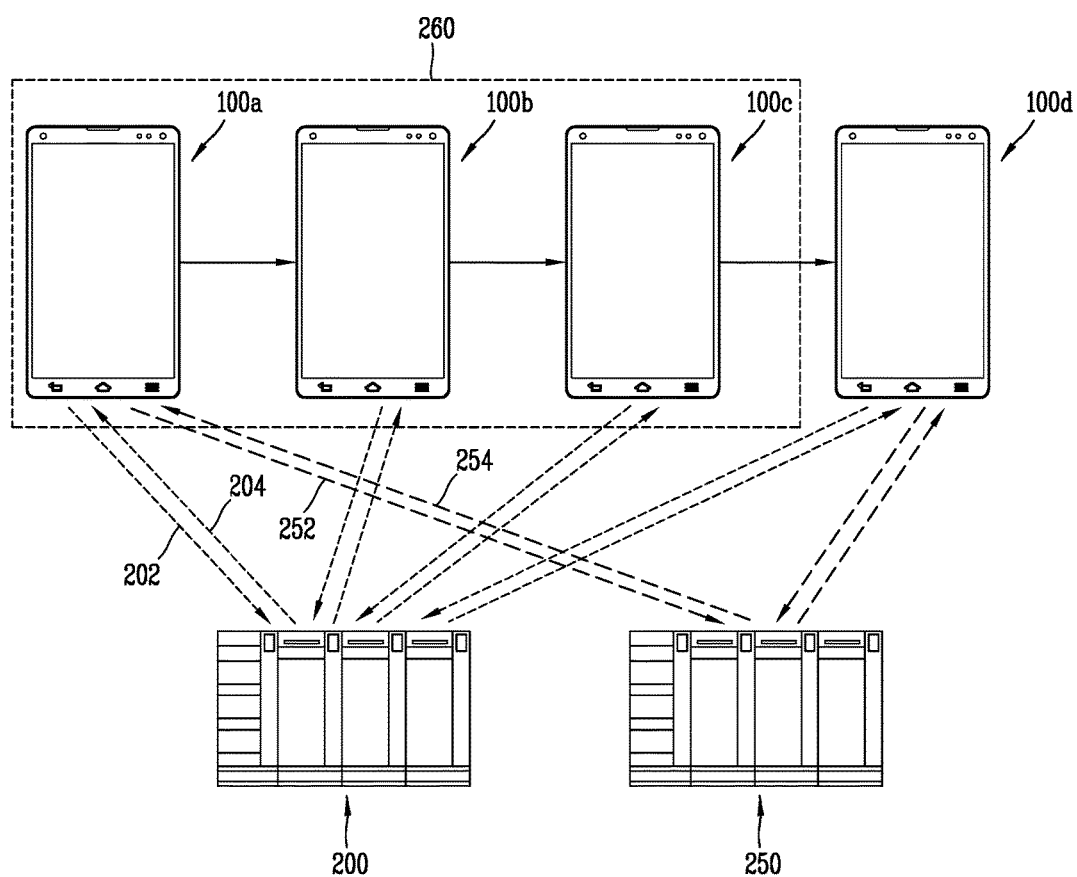

The network positioning method may be classified into a first network positioning method and a second network positioning method according to a provider providing the AP database. Hereinafter, FIGS. 2A to 2C are conceptual views illustrating network positioning methods that can be executed in the mobile terminal 100 according to the present invention.

First, for the first network positioning method, the provider providing the AP database may be an operating system provider supplying an operating system of the mobile terminal.

A service associated with the location information regarding the mobile terminal 100 may be a service that is basically provided in the operating system currently included in the mobile terminal 100. Accordingly, the operating system provider that manufactures and supplies the operating system can provide a database (AP database) containing the information related to the APs and a positioning server (hereinafter, referred to as a first positioning server) including the AP database.

Also, the operating system may generally be mounted in various types of terminals, regardless of a mobile terminal or a mobile terminal chipset. As a result, more cloud sourcing is possible, and thus a larger amount of AP information can be obtained. In addition, in terms of characteristics of a location calculation method using triangulation, more precise location calculation is possible when more identifiable APs are located near the mobile terminal, which is advantageous in that accurate location of the mobile terminal 100 can be acquired.

FIG. 2A illustrates the first network positioning method.

As illustrated in FIG. 2A, when the mobile terminal 100 moves to a first location 100a, a second location 100b, a third location 100c and a fourth location 100d, the mobile terminal 100 may acquire inherent information related to APs located in the vicinity of the mobile terminal 100 and wireless signal information received from the APs by scanning surroundings every time when the movement is made. The mobile terminal 100 may then transmit the acquired information to a first positioning server 200 (202).

Meanwhile, the first positioning server 200 may include an AP database according to a first network positioning method provided by an operating system provider of the mobile terminal 100. As described above, the AP database provided by the operating system provider may include location information and unique information related to more APs due to sufficient cloud sourcing. Therefore, the AP database of the first positioning server 200 may be highly likely to include location information and inherent information regarding APs corresponding to the APs included in the information received from the mobile terminal 100. This may result in increased accuracy.

Meanwhile, the first positioning server 200 may identify the APs corresponding to the information on the APs included in the information received from the mobile terminal 100, from the AP database provided therein. The location of the mobile terminal 100 may be calculated based on the locations of the identified APs and the wireless signal information received from the mobile terminal 100, and the calculated result may be transmitted to the mobile terminal 100 (204). Accordingly, as illustrated in FIG. 2A, in response to each of scan information transmitted from each location of the currently-moving mobile terminal 100, the mobile terminal 100 may receive the location information from the first positioning server 200.

Meanwhile, instead of calculating the location of the mobile terminal 100, the first positioning server 200 may also transmit information related to the locations of the identified APs, namely, AP information to the mobile terminal 100 (204). In this instance, the mobile terminal 100 may also directly calculate its location from adjacent AP locations based on the locations of the APs included in the received AP information and information related to the previously-sensed wireless signals.

On the other hand, the first network positioning method has a disadvantage in view of having to frequently access the first positioning server 200, as illustrated in FIG. 2A, in order to acquire the location information on the mobile terminal 100. That is, in case where the first positioning server 200 calculates the location of the mobile terminal 100 based on the information received from the mobile terminal 100, the mobile terminal 100 should scan the adjacent APs and wireless signals and transmit the scanned information, in order to detect its changed location even when only intensity of the wireless signal changes according to the location change of the mobile terminal 100. Also, the mobile terminal 100 should receive location information from the first positioning server 200 in response to the transmission.

Further, instead of receiving the location information, even when the mobile terminal 100 receives the AP information related to the identified APs and directly calculates its own location based on the information received from the first positioning server 200, if the mobile terminal 100 moves out of an area covered by the scanned adjacent APs, it is necessary to re-execute the process of exchanging information with the first positioning server 200.

As such, the first network positioning method requires for the access to the first positioning server 200 even though providing high accuracy, which results in an increased amount of currents consumed.

On the other hand, for the second network positioning method, the provider providing the AP database may be a manufacturer of the mobile terminal 100 or a chipset manufacturer that manufactures the chipset used as a CPU of the mobile terminal 100. In this instance, the manufacturer or the chipset manufacturer can perform the network positioning function as a function that can be performed by the mobile terminal or the CPU of the mobile terminal 100. In this instance, for the positioning function that is performed by the mobile terminal 100 itself, a server (second positioning server) having an AP database including the information related to the APs may be operated, and the second network positioning server may provide AP information that is necessary for the mobile terminal 100 to detect its own location.

Meanwhile, the AP information provided by the manufacturer of the mobile terminal 100 or the manufacturer of the chipset of the mobile terminal 100 may also be generated based on big data collected in a cloud sourcing manner. However, for the manufacturer of the mobile terminal 100 or the manufacturer of the chipset, the AP information may be collected through cloud sourcing by the manufacturer or the mobile terminal manufactured by including the chipset. Accordingly, less AP information may be collected than those included in the AP database provided by the operating system provider through the first network positioning method. Also, when AP information corresponding to surrounding information scanned by the mobile terminal is not present in the AP database included in the second network positioning server, it may be impossible to acquire sufficient information for calculating the location of the mobile terminal, and in this instance, a failure of detecting the location of the mobile terminal is caused.

Meanwhile, in the first network positioning method, the operating system provider has to design an operating system to be commonly used, regardless of the mobile terminal or the mobile terminal chipset, and thereby all functions have to be disadvantageously designed according to a predetermined standard. On the other hand, the manufacturer of the mobile terminal 100 or the manufacturer of the chipset of the mobile terminal 100 does not have such a limitation, so that a part of functions of the mobile terminal or chipset can be changed or modified for the network positioning function.

By use of this, the manufacturer of the mobile terminal or the manufacturer of the chipset can design the mobile terminal 100 to store the AP information related to the APs, which are located in a predetermined area from the second positioning server 250, in the chipset or in a part of the memory. When the information related to the scanned adjacent APs and wireless signals of the APs is received from the mobile terminal 100, the second positioning server 250 may then transmit AP information related to APs located in a predetermined area including the APs. The mobile terminal 100 may thus receive and store the information. Also, by allowing the mobile terminal 100 to first search for the pre-stored AP information before accessing the second positioning server 250, the number of times the mobile terminal 100 accesses the second positioning server 250 can be reduced.

FIG. 2B illustrates the second network positioning method.

Similar to FIG. 2A, FIG. 2B exemplarily illustrates that the mobile terminal 100 moves to the first location 100*a*, the second location 100*b*, the third location 100*c* and the fourth location 100*d*. When the mobile terminal 100 is in the first location 100*a* and transmits information related to APs scanned near the mobile terminal 100 and wireless signals of the APs to the second positioning server 250 (252), the second positioning server 250 may identify, from the AP database provided therein, the APs corresponding to the received information. And the second positioning server 250 may transmit AP information related to the identified APs and APs located in a predetermined area including the locations of the identified APs to the mobile terminal 100. Hereinafter, AP information including location-related information and inherent information regarding the APs within the predetermined area, transmitted from the second positioning server 250, is referred to as tile database (DB) information.

Meanwhile, the tile database information may include AP information related to not only the APs currently scanned near the mobile terminal 100 but also the APs located within the predetermined area including the scanned APs. Therefore, even if the mobile terminal 100 moves, when the AP information corresponding to the APs retrieved in the vicinity of the mobile terminal 100 is included in the tile database information, the mobile terminal 100 can detect (find) its own position sufficiently even without the access to the second positioning server 250.

Accordingly, when an area covered by the tile database information includes an area in which the APs adjacent to the second location 100*b* and the third location 100*c* of the mobile terminal 100 are located (260), the AP information corresponding to the scanned APs in the vicinity of the second location 100*b* and the third location 100*c* is searched for from the tile database information even when the mobile terminal 100 moves to the second location 100*b* and the third location 100*c*. Therefore, the mobile terminal 100 can detect its own position at each location even without receiving the AP information from the second positioning server 250. As a result, even if the mobile terminal 100 moves to the second location 100*b* and the third location 100*c*, the mobile terminal 100 may not access the second positioning server 250.

When the mobile terminal 100 moves to the fourth location 100*d*, AP information on APs located in the vicinity of the fourth location 100*d* is not included in the tile database information. As a result, the mobile terminal 100 cannot find (detect) the information related to the APs from the tile database information. Then, the mobile terminal 100 may access the second positioning server 250 again and receive new tile database information which includes AP information related to APs which are located adjacent to the fourth location 100*d* and APs located within a predetermined area including the APs adjacent to the fourth location 100*d*.

As illustrated in FIG. 2B, according to the second network positioning method, the number of times of accessing the second positioning server 250 can be significantly reduced. Accordingly, a current consumption due to the access to the second positioning server 250 can be greatly reduced.

As such, the second network positioning scheme can greatly reduce the current consumption, but may fail to store sufficient AP information in the AP database, as described above. Therefore, sufficient AP information may not be included in the tile database transmitted to the mobile terminal 100, which may lead to failure in acquisition of location information related to the mobile terminal 100.

However, even the second network positioning method may allow the location of the mobile terminal 100 to be measured more quickly and more accurately in some areas than the first network positioning method. For example, although it is not comparable globally to the number of users using a specific operating system, the number of users of mobile terminals manufactured by a manufacturer of a specific mobile terminal or the number of users of mobile terminals having a chipset of the specific mobile terminal may be sufficient in some areas.

If the number of users of mobile terminals from a particular manufacturer or mobile terminals including a specific chipset is sufficient, for example, in Korea or the United States, sufficient cloud sourcing can be achieved. Accordingly, in Korea or the United States, the second network positioning method may be faster and more accurate to detect the location of the mobile terminal than the first network positioning method.

Accordingly, there may be a method of using both the first network positioning method and the second network positioning method, and using more accurate location information among the location information calculated by the respective positioning methods. Hereinafter, this network positioning method is referred to as a combo positioning method.

Such a combo positioning method may indicate a method of using both the first network positioning method and the second network positioning method as described above. That is, as illustrated in FIG. 2C, in case where the mobile terminal 100 is located in the first location 100*a*, when a current location of the mobile terminal 100 is requested from an application, the controller 180 may detect APs located adjacent to the mobile terminal 100 and wireless signals of the APs, and transmit the searched information to both of the first positioning server 200 and the second positioning server 250 (202, 252). The controller 180 may then receive AP information related to APs identified according to the searched information from both of the first positioning server 200 and the second positioning server 250.

In this instance, the first positioning server 200 may transmit only the AP information related to the APs identified from the information received from the mobile terminal 100 (204). The second positioning server 250, on the other hand, may transmit information including the AP information related to the APs identified from the received information and AP information related to other APs within a predetermined area 260 including the identified APs, namely, the tile database information (254). Then, the mobile terminal 100 can calculate the location thereof using more accurate information among the information received from each of the positioning servers 200 and 250. For example, the mobile terminal 100 may select information including more AP information corresponding to the APs currently detected near the mobile terminal 100, as more accurate information, among the information received from each of the positioning servers 200 and 250, and calculate its location based on the selected information. In general, in terms of the characteristics of the triangulation method, more accurate location of the mobile terminal 100 can be detected when more APs to be a reference are identified.

When the mobile terminal 100 moves to the second location 100*b*, the mobile terminal 100 may transmit information related to APs detected in the second position 100*b* to the first positioning server 200 again. The mobile terminal 100 may also receive AP information related to APs identified from the first positioning server 200. Meanwhile, when the AP information related to the APs detected in the second position 100b is included in pre-transmitted tile database information from the second positioning server 250, the mobile terminal 100 may not access the second positioning server 250. The mobile terminal 100 may thus acquire its own location according to information with higher accuracy by comparing the AP information related to the APs received from the first positioning server 200 with the AP information corresponding to the APs detected in the second location 100b among the pre-transmitted tile database information.

When the location of the mobile terminal 100 is detected according to the combo positioning method, an accurate location of the mobile terminal 100 can be detected regardless of an area where the mobile terminal 100 is located. However, as illustrated in FIG. 2C, since the mobile terminal 100 has to access both of the first positioning server 200 and the second positioning server 250, current consumption more increases than that upon using one of the first network positioning method or the second network positioning method.

As described above, the second network positioning method uses the tile database information to acquire the location of the mobile terminal 100 even without accessing the second positioning server when the mobile terminal 100 moves within a predetermined area. Accordingly, the second network positioning method allows the location information with less power consumption and within a shorter time.

Accordingly, the present invention makes it possible to utilize the first network positioning method in order to compensate for the accuracy of the location information, which is a disadvantage of the second network positioning method, while maximizing the advantages of the second network positioning method. That is, the controller 180 of the mobile terminal 100 according to the embodiment of the present invention may first calculate the location of the mobile terminal 100 through the second network positioning method, and then calculate the location of the mobile terminal through the first network positioning method only when the location is not calculated for more than a preset time. Accordingly, the present invention can calculate the location of the mobile terminal 100 more accurately than the case of using only the second network positioning method, while reducing current consumption more than the case of using only the first network positioning method.

Hereinafter, embodiments related to a control method to be implemented in the mobile terminal 100 having such a configuration will be described with reference to the accompanying drawings. It will be apparent to those skilled in the art that the present invention may be embodied in other specific forms without departing from the spirit or essential characteristics thereof.

Figure 3:
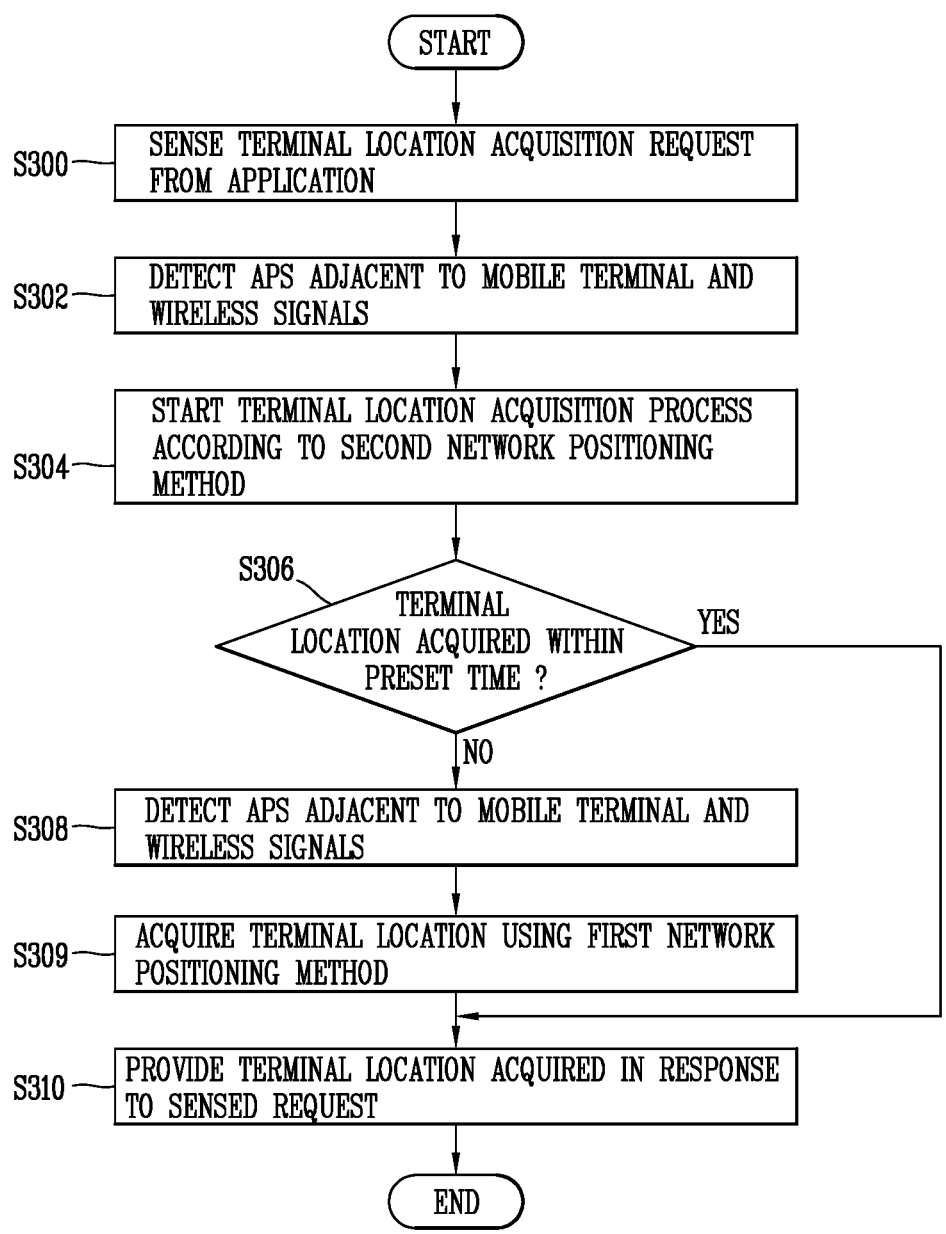
FIG. 3 is a flowchart illustrating a positioning process executed in a mobile terminal in accordance with an embodiment of the present invention.

FIG. 3 is a flowchart illustrating a positioning process executed in the mobile terminal 100 in accordance with an embodiment of the present invention. In the following description, it is assumed that the mobile terminal 100 acquires location information using a network positioning method for convenience of explanation. However, it goes without saying that the mobile terminal 100 according to the embodiment of the present invention is not limited thereto. That is, it is needless to say that the location information on the mobile terminal 100 may also be obtained by using a method different from the network positioning method, for example, a GPS positioning method.

Referring to FIG. 3, the controller 180 of the mobile terminal 100 according to the embodiment of the present invention may sense a location acquisition request of the terminal from an application (S300). For example, when a location-related application of the mobile terminal 100 is executed or a service using a current location of the mobile terminal 100, such as a navigation application, is started, the controller 180 may sense a location acquisition request of the mobile terminal 100 from the application or service.

Then, the controller 180 may detect APs adjacent to (around) the mobile terminal 100. When the APs are detected, the controller 180 may sense wireless signals transmitted from the detected APs, respectively (S302). In step S302, the controller 180 may acquire inherent information related to each of the APs from the wireless signals transmitted from the detected APs, and may sense intensity of each of the wireless signals. Here, the intensity of each of the sensed wireless signals may be utilized as distance information between each AP and the mobile terminal 100.

Meanwhile, the controller 180 may start a positioning process according to the second network positioning method using information related to the APs detected in step S302 (S304). That is, when prestored tile database information is present, the controller 180 may detect whether there is AP information corresponding to the APs detected in step S302 among AP information included in the prestored tile database information.

When the prestored tile database information includes the AP information corresponding to the APs detected in step S302, the controller 180 may identify locations of the detected APs in step S302 based on the AP information included in the tile database information. And the controller 180 may calculate the location of the mobile terminal 100 based on intensity of each wireless signal corresponding to each AP and acquire location information according to the calculation result.

On the other hand, when the prestored tile database information does not include the AP information corresponding to the APs detected in step S302, the controller 180 may transmit information related to the APs detected in step S302 to the second positioning server which includes the AP database according to the second network positioning method. In response to this, the controller 180 may receive new tile database information. Here, the new tile database information may be information which includes the AP information related to the detected APs and additionally AP information related to other APs within a predetermined area including the locations of the detected APs.

Meanwhile, the controller 180 may execute positioning using the second network positioning method and simultaneously check whether or not a preset time has elapsed (S306). When the preset time has not elapsed, the controller 180 may calculate the location of the mobile terminal 100 according to the second network positioning method, and acquire location information according to the calculation result.

However, when the location of the mobile terminal 100 is not calculated according to the second network positioning method until the preset time elapses, the controller 180 may detect APs adjacent to the mobile terminal 100. When the APs are detected, the controller 180 may sense wireless signals transmitted from the detected APs, respectively (S308), and detect the location of the mobile terminal 100 according to the first network positioning method using the information related to the APs detected in step S308. That is, the controller 180 may transmit the information related to the detected APs to the first positioning server including the AP database according to the first network positioning method only when the location of the mobile terminal 100 is not calculated according to the second network positioning method for the preset time.

In response to the transmission of the information related to the detected APs, the controller 180 may receive a result calculated for the current location of the mobile terminal 100 or the AP information related to the APs corresponding to the detected APs from the first positioning server. Here, when the first positioning server transmits the AP information, the mobile terminal 100 may identify the location of each of the APs detected in step S302 from the received AP information, and calculate a current location of the mobile terminal 100 based on the identified locations of the APs.

Accordingly, the controller 180 may transmit the location information obtained according to the result received from the first positioning server or the result calculated based on the AP information to the application or service which requests for the location information on the mobile terminal 100 in step S300 (S310). The process illustrated in FIG. 3 may be repeated when acquisition of location information is requested again according to the location change of the mobile terminal 100.

Meanwhile, when the location information on the mobile terminal 100 has been acquired through the second network positioning method within the preset time according to the detection result in step S306, the controller 180 may go to step S310 and thus provide the location information acquired in step S306 to the application or service requesting for the location information on the mobile terminal 100 in step S300. Accordingly, the mobile terminal 100 according to the embodiment of the present invention can first calculate its location according to the second network positioning method, and then complementarily calculate its location according to the first network positioning method only when the location calculation is difficult to be executed. This may result in more reducing power consumption caused due to the location calculation with maintaining accuracy of the location calculation of the mobile terminal 100.

In step S306, the controller 180 of the mobile terminal 100 may decide whether the location information has been acquired according to the second network positioning method within the preset time based on whether or not there is the tile database information including the AP information corresponding to the APs detected in step S302. This is because the time required for receiving the AP information from the positioning server is much longer than the time required for calculating the location of the mobile terminal 100 based on the AP information.

Figure 4:
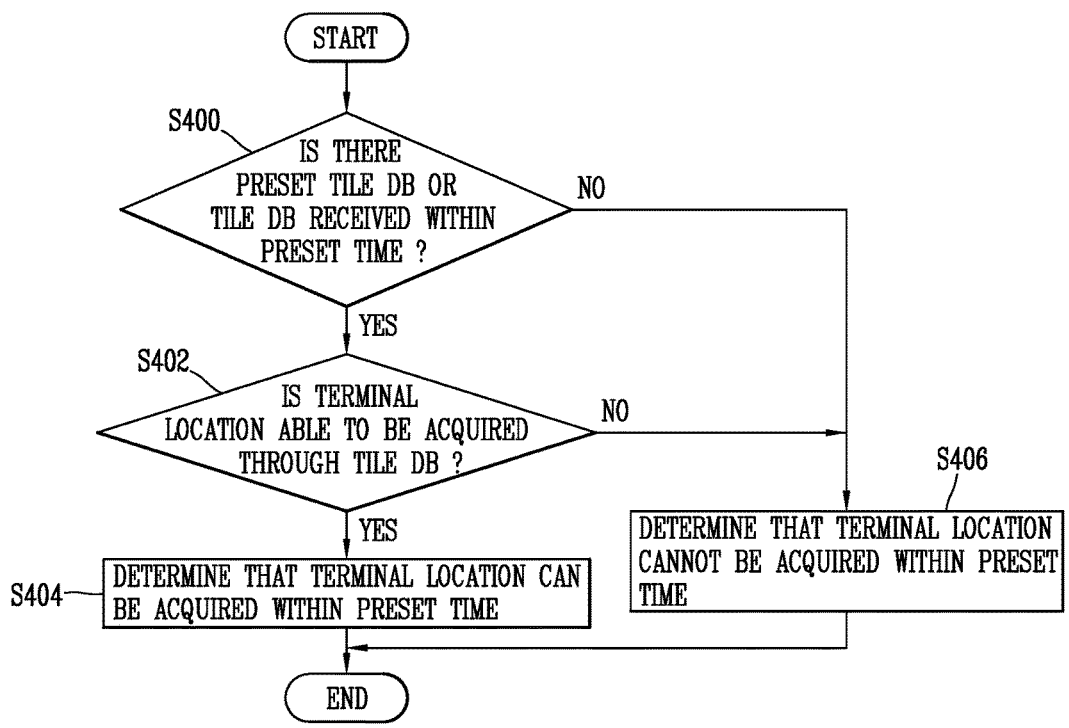
FIG. 4 is a flowchart illustrating in more detail a process of determining whether or not positioning of a mobile terminal can be executed according to a preceding network positioning method, in a mobile terminal in accordance with an embodiment of the present invention.

FIG. 4 is a flowchart illustrating in more detail an operation of determining whether or not the controller 180 of the mobile terminal 100 has acquired the location information according to the second network positioning method within the preset time of step S306 of FIG. 3.

First, the controller 180 may detect whether or not prestored tile database information is present (S400). Here, the controller 180 may determine that there is the prestored tile database information when there is the tile database information received from the second positioning server within the preset time.

When it is determined in step S400 that there is no tile database information, the controller 180 may determine that the location information on the mobile terminal 100 can not be acquired according to the second network positioning method within the preset time (S406). Then, the controller 180 may go to step S308 of FIG. 3 to detect the location of the mobile terminal 100 using the first network positioning method (S308).

On the other hand, when it is determined in step S400 that there is the tile database information, the controller 180 may check whether or not the location of the mobile terminal 100 can be acquired based on the stored tile database information (S402). Here, the controller 180 may determine whether or not the location of the mobile terminal 100 can be acquired based on the stored tile database information according to whether or not the AP information corresponding to the APs detected in step S302 of FIG. 3 is included in the stored tile database information. That is, when the AP information corresponding to the detected APs is included in the stored tile database information, the controller 180 may determine that the location of the mobile terminal 100 can be acquired based on the stored tile database information (S404). The controller 180 may then go to step S310 directly from step S306 of FIG. 3 to calculate the location of the mobile terminal 100 and obtain the location information based on the AP information included in the tile database information.

However, when the AP information corresponding to the detected APs is not included in the stored tile database information, the controller 180 may determine that the location of the mobile terminal 100 cannot be acquired based on the stored tile database information (S406). Then, the controller 180 may go to step S308 of FIG. 3 to search for (detect) the location of the mobile terminal 100 using the first network positioning method (S308).

Meanwhile, when the process of acquiring the location information is executed according to the second network positioning method in step S304 of FIG. 3, the controller 180 may transmit the information related to the APs detected in the vicinity of the mobile terminal 100 to the second positioning server on the basis of whether or not the pre-stored tile database information is present and of the AP information stored in the tile database. In this instance, in response to the transmission of the information from the mobile terminal 100, the second positioning server may transmit the tile database information including the AP information related to the detected APs and other APs in the vicinity of the mobile terminal 100. In this instance, the tile database information may not be received within the 'preset time' in step S306 of FIG. 3.

As such, when the tile database information is not received within the 'preset time' in step S306, the controller 180 may determine that the location information can not be acquired according to the second network positioning method within the preset time. In this instance, the controller 180 may go to step S308 of FIG. 3 to perform the location information acquisition process according to the first network positioning method.

Meanwhile, the controller 180 may, of course, receive and store the tile database information transmitted from the second positioning server even when the tile database information is received after the preset time elapses. In this instance, the received tile database information may be used as prestored tile database information when the process of FIG. 3 is executed again according to the location change of the mobile terminal 100. Therefore, when the stored tile database information includes the AP information related to the APs detected adjacent to the mobile terminal 100, the location information on the mobile terminal 100 can be acquired according to the second network positioning method within the 'preset time'.

Meanwhile, the 'preset time' in step S306 may be decided according to a time required for the controller 180 to acquire the location information on the mobile terminal 100 without receiving new tile database information from the second positioning server. For example, the 'preset time' may be a time taken for detecting whether or not the tile database information includes the AP information corresponding to the APs detected adjacent to the mobile terminal 100 in a state that the prestored tile database information is present.

In this instance, when the access to the second positioning server is executed due to an absence of the prestored tile database information or absence of the AP information corresponding to the APs detected adjacent to the mobile terminal 100 in the prestored tile database information, the preset time may elapse. Therefore, the controller 180 may go to step S308 of FIG. 3 to acquire the location information on the mobile terminal 100 according to the first network positioning method. When new tile database information is received after the lapse of the preset time, the controller 180 may store the received new tile database information and use the information later when acquiring the location information in response to the location change of the mobile terminal 100.

Meanwhile, a more efficient network positioning method may be employed (selected) according to an area where the mobile terminal 100 is located. For example, since AP information according to the second network positioning method is sufficiently collected in an area such as in Korea or the United States, the second network positioning method or the network positioning method according to the embodiment of the present invention can be more efficient. However, if the AP information is insufficient or the mobile terminal is located in an area where AP information is not sufficiently collected, the first network positioning method or the combo positioning method may be employed to satisfy accuracy of location information which is requested from an application or service. Accordingly, the controller 180 of the mobile terminal 100 according to the embodiment of the present invention may first acquire rough location information on the mobile terminal 100 and select a network positioning method according to an area where the mobile terminal 100 is located, prior to acquiring the location information on the mobile terminal 100 through a network positioning method.

Figure 5:
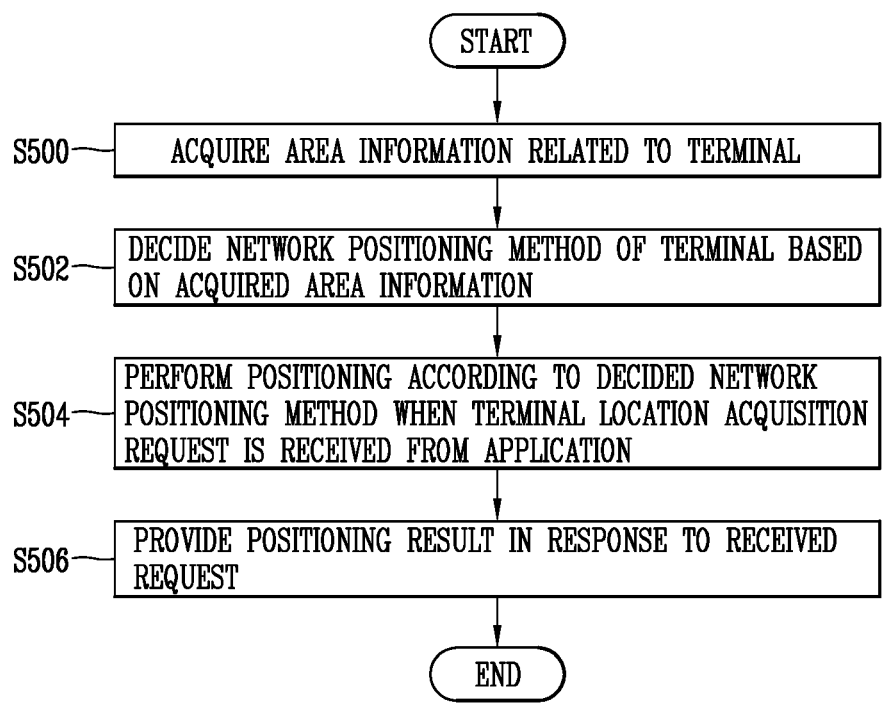
FIG. 5 is a flowchart illustrating a process of performing positioning according to a network positioning method decided based on a currently-located area of a mobile terminal in accordance with an embodiment of the present invention.

FIG. 5 is a flowchart illustrating an operating process of deciding a network positioning method according to a currently-located area of the mobile terminal 100 and executing positioning.

Referring to FIG. 5, the controller 180 of the mobile terminal 100 according to the embodiment of the present invention may first acquire area information related to an area where the mobile terminal 100 is located when it is determined that the mobile terminal 100 has moved by a predetermined level or more (S500). For example, when overseas roaming is detected or when a time value immediately before power is turned off and a time value when the power is turned on differ from each other by more than a predetermined level, the controller 180 may determine that the mobile terminal 100 has been moved by the predetermined level or more and obtain area information related an area where the mobile terminal 100 is located.

In step S500, the controller 180 may use another positioning method to obtain the area information. For example, the controller 180 may acquire the location of the mobile terminal 100 using the GPS positioning method. In this instance, a country corresponding to the location of the mobile terminal 100 measured according to the GPS positioning may be the area information.

Alternatively, when roaming is performed overseas, the controller 180 may obtain information on a country where the mobile terminal 100 is currently located from registration information related to a visited network. For example, the controller 180 may identify the country where the mobile terminal 100 is currently located based on Public Land Mobile Network (PLMN) ID information from the visited network for the roaming. Or, the controller 180 may identify the country where the mobile terminal 100 is currently located based on a notification message received from the visited network during the overseas roaming. The thusly-identified country information may be the area information according to the location of the mobile terminal 100.

Meanwhile, when the area information according to the location of the mobile terminal 100 is obtained in step S500, the controller 180 can set the network positioning method of the mobile terminal 100 based on the obtained area information (S502). For example, when the area where the mobile terminal 100 is located is South Korea or the US in step S500, the controller 180 may set the positioning method as the second network positioning method or the network positioning method according to the embodiment of the present invention. On the other hand, when the area where the mobile terminal 100 is located is another country where AP information is not sufficiently collected, the controller 180 may set the positioning method as the first network positioning method or the combo positioning method. To this end, the memory 170 may prestore information related to a predecided positioning method for each country. The controller 180 may set the positioning method as a positioning method corresponding to a country where the mobile terminal is located based on the information prestored in the memory 170.

When the positioning method is set in step S502, the controller 180 may detect an application or service requesting for the location information on the mobile terminal 100. In response to the request for the location information, the controller 180 may calculate the location of the mobile terminal 100 according to the positioning method set in step S502, and acquire location information from the calculated result (S504). The acquired location information may be provided to the application or the service (S506). Accordingly, the present invention can acquire the location information on the mobile terminal 100 in a more efficient network positioning manner depending on the area where the mobile terminal 100 is located.

Figure 6A:
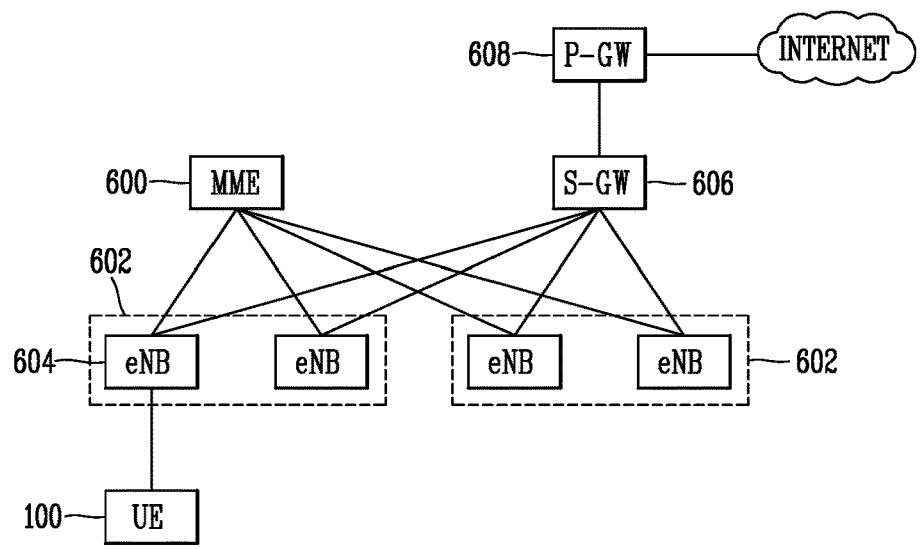
FIGS. 6A and 6B are conceptual views illustrating an example of identifying a country where a mobile terminal is located prior to executing positioning in the mobile terminal in accordance with an embodiment of the present invention.
Figure 6B:
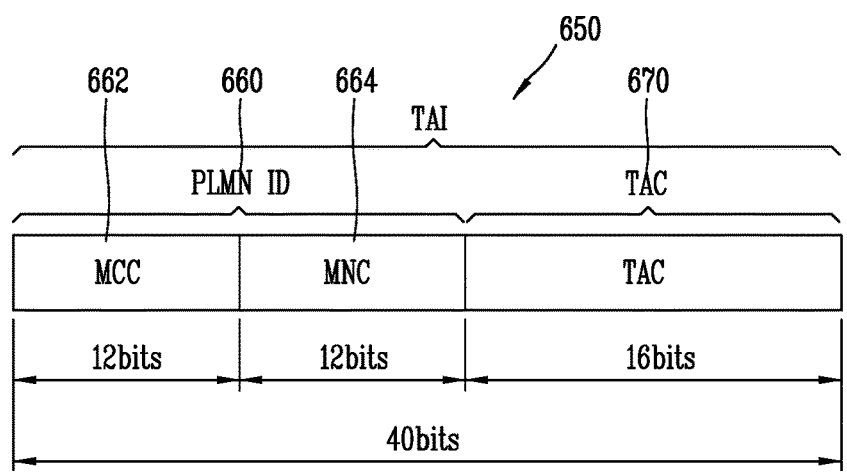

Meanwhile, FIGS. 6A and 6B are conceptual views illustrating an example in which the mobile terminal 100 according to the embodiment of the present invention identifies a country according to a current location of the mobile terminal 100 before performing positioning according to a network positioning method.

First of all, FIG. 6A is a conceptual view illustrating an example of a network environment that a mobile terminal accesses in accordance with an exemplary embodiment of the present invention.

Referring to FIG. 6A, eNB 604 may be wirelessly connected to a user equipment (UE; mobile terminal) 100. The eNB 604 may assign a frequency to the UE 100, and manage every wireless function including a wireless bearer control, an approval control, a mobility control, scheduling and security. The eNB 604, for example, may be installed at each of a plurality of cells constructing a tracking area (TA).

The eNB 604 may be connected to a core network, which includes a mobility management entity (MME) 600, a serving gateway (S-GW) 606, and a packet gateway (P-GW) 608.

The MME 600 may be connected to the eNB 604 via a wireless channel, manage the UE 100 in an idle mode, and designate (select) the S-GW 606 and the P-GW 608. The MME 600 may carry out functions involved in roaming and authentication, and process bearer signals generated in the UE 100.

The S-GW 606 may serve as a mobility anchor during movement of the UE 100. The P-GW 608 may assign an Internet protocol (IP) address to the UE 100, carry out functions involved in packet data of the core network, and serve as a mobility anchor while the UE 100 moves between a 3GPP wireless network and a non-3GPP wireless network.

When the mobile terminal, namely, the UE 100 is powered on, the UE 100 may transmit an ATTACH REQUEST message to a base station (eNB) 604 of a cell, at which the UE 100 is located, in order to request for using a network from the MME 600 (S400). Here, the ATTACH REQUEST message may include international mobile subscriber identity (IMSI) which is identification information of the UE 100.

Upon reception of the ATTACH REQUEST message, the eNB 604 may transmit to the MME 600 an initial UE message, which includes an ID (Evolved-universal terrestrial radio access network (E-UTRAN) cell global identifier; ECGI) of a cell where the eNB 604 is located, and track area identifier (TAI) information related to the cell. Here, the eNB 604 may transmit the ATTACH REQUEST message by attaching it in the initial UE message. The TAI may refer to identification information related to a track area (TA) including the cell of the eNB 604 which has received the ATTACH REQUEST message.

In the meantime, the MME 600 may update a location of the UE 100 based on those information, namely, IMSI, TAI and the like, included in the received initial UE message. The MME 600 may authenticate the UE 100 through a home subscriber server (HSS), and register the UE 100 such that the UE 100 can access a network when the UE 100 is an authenticated subscriber.

The MME 600 may transmit an ATTACH ACCEPT message to the UE 100, in response to the ATTACH REQUEST message of the UE 100. To this end, the MME 600 may transmit the ATTACH ACCEPT message to the eNB 604 such that the ATTACH ACCEPT message can be transferred to the UE 100. The eNB 604 may then transfer the ATTACH ACCEPT message received from the MME 600 to the UE 100. The UE 100 may thus recognize that it has been registered in the currently-accessed network and can perform wireless communication through the accessed network.

Meanwhile, the MME 600 may transmit identification information (TAI list) related to other TAs adjacent to a TA corresponding to the TAI information received from the eNB 604, based on the TAI information included in the initial UE message, in a manner of attaching the identification information to the ATTACH ACCEPT message. Accordingly, the UE 100 which has received the ATTACH ACCEPT message may acquire the information related to the currently-located TA and other TAs adjacent to the currently-located TA.

The TAI list, as aforementioned, may include information related to other TAs adjacent to the TA at which the UE (mobile terminal) 100 is currently located, namely, the TAI information. The TAI information may include information related to a location of a corresponding TA.

FIG. 6B is a conceptual view illustrating a frame structure of the TAI information.

Referring to FIG. 6B, the TAI information 650 may be in the form of data of 40 bits in maximum, and may include a PLMN ID 660, and a track area code (TAO) 670. Here, the TAO 670 may refer to an inherent value assigned for each TA by a mobile phone carrier, and the PLMM ID 660 may refer to an inherent value for identifying a mobile phone carrier.

The controller 180 may compare the PLMN ID 660 with a home PLMN ID currently stored in the memory 170. When the PLMN ID 660 acquired from the received TAI information is different from the home PLMN ID, the controller 180 may determine that the mobile terminal 100 has currently accessed another network, other than a home network, namely, accessed a visited network.

Here, the PLMN ID 660, as illustrated in FIG. 6B, may include a mobile country code (MCC) 662, and a mobile network code (MNC) 664. The controller 180 may identify identification information related to the currently-accessed visited network, and a currently-located area, namely, a currently-located country of the mobile terminal 100, from the MCC 662 and the MNC 664 included in the acquired PLMN ID 660, namely, the PLMN ID 660 of the visited network. For example, 'South Korea' may have the MCC 662 assigned with '450,' 'SKT' which is one of mobile phone carriers in 'South Korea' may have the MNC 664 assigned with '05.' Therefore, when the PLMN ID 660 is '45005,' it can be recognized that the mobile terminal 100 has currently accessed a network of the mobile phone carrier 'SKT' located in 'South Korea.'

Accordingly, the mobile terminal, namely, the UE 100 according to the embodiment disclosed herein may identify the country corresponding to the current location based on the received TAI list. That is, the controller 180, as aforementioned, may check the MCC 662 from the TAI information included in the TAI list received from the MME 600. The controller 180 may thus identify the country that the mobile terminal 100 is currently located from the checked MCC 662.

To this end, the mobile terminal 100 according to the embodiment disclosed herein may prestore information for identifying a specific country from the checked MCC 662 in the memory 170. In this instance, the information stored in the memory 170 may include country information corresponding to each MCC. Hereinafter, information for identifying a country corresponding to a specific MCC is referred to as MCC country identification information.

Meanwhile, the mobile terminal, namely, the UE 100 according to the embodiment disclosed herein may move to a different location at any time as the user moves. When the UE 100 moves out of a tracking area (TA) in response to the user's movement, the UE 100 may sense this and perform a tracking area update (TAU).

For example, the UE 100 may receive broadcast system information block 1 (SIB1) broadcasted from a base station (eNB) 604 of a currently-located cell. Here, the base station (eNB) 604 of the cell may broadcast inherent information, namely, track area code (TAO) related to a TA, to which the eNB 604 belongs, through the SIB1.

The UE 100 may check whether or not a TAI corresponding to the TAC received from the eNB 604 is present in those TAI information included in the prestored TAI list. When the TAI corresponding to the TAC received from the eNB 604 is not present in the prestored TAI list, the UE 100 may recognize the change in the TA, and start to perform the TA update (TAU) procedure.

Or, the UE 100 may perform the TAU procedure after a lapse of a preset period of time for a periodic TAU. In this instance, the UE 100 may transmit a TAU Request message to the eNB 604, and the eNB 604 may transfer the TAU Request message to the MME 600. The MME 600 may then transmit a TAU accept message for accepting the TAU to the UE 100.

In this instance, the MME 600 may transmit the TAI list along with the TAU accept message. Here, the TAI list may refer to a list including TAIs of other TAs adjacent to the TA at which the UE 100 is currently located.

Therefore, the UE 100, namely, the mobile terminal 100 according to the embodiment disclosed herein may acquire the TAI information involved in the currently-located TA, and the TAI information involved in the adjacent TAs upon the completion of the TAU procedure. The controller 180 of the mobile terminal 100 may acquire the PLMN ID including the MCC and MNC in a manner of parsing the TAI information. The acquired PLMN ID may allow for identifying identification information related to the currently-accessed visited network, and the area, namely, the country where the mobile terminal 100 is currently located.

Accordingly, the mobile terminal 100 according to the embodiment of the present invention can identify the country where the current mobile terminal 100 is currently located without performing a separate positioning process when accessing the visited network by the occurrence of overseas roaming. And a network positioning method corresponding to the identified country can be set. That is, a specific network positioning method corresponding to the area where the mobile terminal 100 is currently located may be selected even without performing the positioning process, and the accurate location of the mobile terminal 100 can be detected according to the selected positioning method.

The mobile terminal 100 according to the embodiment of the present invention may also detect an occurrence of overseas roaming in various manners. For example, the controller 180 may detect an occurrence of such overseas roaming from a specific caller, for example, a guide message provided from a mobile communication company to which the user has subscribed.

Figure 7:
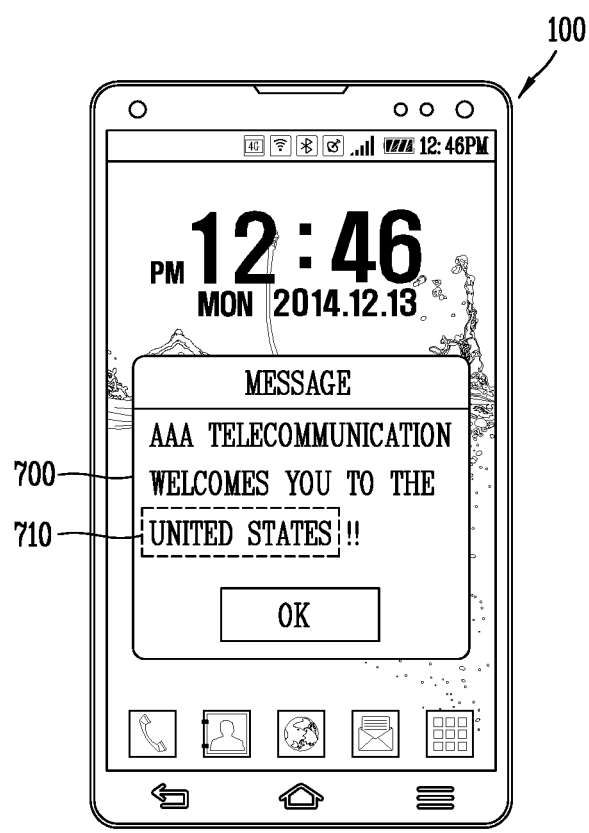
FIG. 7 is a conceptual view illustrating another example of identifying a country where a mobile terminal is located prior to executing positioning in the mobile terminal in accordance with an embodiment of the present invention.

For example, when overseas roaming occurs, the mobile terminal 100 may receive a roaming guide message provided to guide a roaming charge or the like from a mobile communication company to which the user has subscribed or from a currently connected visited network. In this instance, the controller 180 may, of course, identify the country where the mobile terminal 100 is currently located through the received guide message. FIG. 7 illustrates an example of such a case.

Referring to FIG. 7, FIG. 7 illustrates an example in which a roaming guide message 700 for notifying an occurrence of overseas roaming is received in the mobile terminal 100 according to the embodiment of the present invention.

As illustrated in FIG. 7, when the roaming guide message 700 is received, the controller 180 may identify that the received message is the roaming guide message 700 based on a sender of the roaming guide message 700 or attribute information related to the roaming guide message 700. As illustrated in FIG. 7, the controller 180 may search for a name of another country, other than a country corresponding to a home PLMN ID, from a string included in the roaming guide message 700.

That is, when the country corresponding to the home PLMN ID is 'Republic of Korea', the controller 180 may search for a string corresponding to a name of another country except for a string corresponding to the name of 'Republic of Korea' from the roaming guide message 700. Accordingly, when receiving the roaming guide message 700 as illustrated in FIG. 7, the controller 180 may search for 'the United States' 710 from the string of the received message. Then, the controller 180 may identify that the country where the mobile terminal 100 is currently located is a country corresponding to the searched string 'United States' 710. The controller 180 may then set a network positioning method corresponding to the identified country.

Meanwhile, when the country corresponding to the current location of the mobile terminal 100 is identified, the controller 180 may transmit information related to the identified country when transmitting the information related to the APs detected in the vicinity of the mobile terminal 100 to the first positioning server or the second positioning server. In this instance, the first positioning server or the second positioning server may use the country information transmitted from the mobile terminal 100 for detecting the AP information related to the APs in the vicinity of the mobile terminal 100 or the APs within a predetermined area including the adjacent APs. In this instance, the first positioning server or the second positioning server can more reduce the range of the AP database from which the AP information is detected based on the country information, thus enabling quicker response.

Effects of the mobile terminal and the control method according to the present invention will be described as follows.

According to at least one of the embodiments of the present invention, the present invention may allow positioning to be executed first by using a network positioning method causing less current consumption, and allow another network positioning method to be executed when positioning is not performed through the preceding positioning method, which may result in minimizing power consumption due to the execution of the positioning.

According to at least one of the embodiments of the present invention, when positioning is requested, a positioning method can be changed into the most suitable network positioning method according to an area where the mobile terminal is currently located, such that the positioning of the mobile terminal can be executed by the most efficient positioning method according to the current location of the mobile terminal.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a location information module configured to acquire location information related to the mobile terminal based on one of a first positioning method that is configured to detect access points (APs) adjacent to the mobile terminal, receive location information related to the detected APs, and acquire the location information on the mobile terminal based on the received location information related to the APs, and a second positioning method that is configured to receive the location information related to the detected APs and other APs located within a predetermined area where the detected APs are located, and acquire the location information on the mobile terminal based on the received location information related to the APs;

a communication unit configured to perform wireless communication with a first positioning server providing first AP information including the location information related to the detected APs or a second positioning server providing second AP information including the location information related to the detected APs and the other APs boated within the predetermined area where the detected APs are boated;

a memory configured to store the first AP information or the second AP information; and a controller configured to;

sense a location acquisition request of the mobile terminal from an application of the mobile terminal;

detect APs adjacent to the mobile terminal, sense wireless signals transmitted from the detected APs, respectively, and acquire an intensity of each of the wireless signals;

start a positioning process according to the second positioning method using the intensity of each of the wireless signals;

execute positioning using the second positioning method and check whether or not a preset time has elapsed;

if the preset time has elapsed, sense wireless signals transmitted from the detected APs, respectively, and detect the location of the mobile terminal according to the first positioning method; and it the preset time has not elapsed, transmit the location information obtained according to a result received from the second positioning method, wherein in the first positioning method, an operating system provider provides an AP database for the detecting of APs adjacent to the mobile terminal, and wherein in the second positioning method, a manufacturer of the mobile terminal provides the AP database for the detecting of APs adjacent to the mobile terminal.

2. The terminal of claim 1, wherein the controller receives the second AP information further including the location information related to the other APs within the predetermined area where the detected APs are located from the second positioning server and acquires the location information on the mobile terminal based on the received second AP information, when the location information related to the detected APs is not included in prestored second AP information in case where the location information on the mobile terminal is acquired according to the second positioning method, and wherein the controller receives the first AP information including the location information related to the detected APS from the first positioning server and acquires the location information on the mobile terminal based on the received first AP information, when the location information corresponding to the detected APs is not included in pre-stored first AP information in case where the location information on the mobile terminal is acquired according to the first positioning method.

3. The terminal of claim 2, wherein the controller stores the received second AP information as the prestored second AP information, when the second AP information further including the location information related to the other APs within the predetermined area where the detected APs are located is received from the second positioning server while acquiring the location information on the mobile terminal according to the first positioning method, after the preset time has elapsed.

4. The terminal of claim 2, wherein the preset time is decided according to a time required for detecting whether or not the prestored second AP information includes the location information corresponding to the detected APs.

5. The terminal of claim 2, wherein the controller determines whether or not the location information on the mobile terminal can be acquired according to the second positioning method for the preset time when the APs located adjacent to the mobile terminal are detected, and acquires the location information on the mobile terminal according to one of the second positioning method or the first positioning method based on the determination result.

6. The terminal of claim 5, wherein the controller determines whether or not the location information on the mobile terminal can be acquired according to the second positioning method, on the basis of whether or not the prestored second AP information includes the location information corresponding to the detected APs, and whether or not the second AP information further including the location information related to the other APs within the predetermined area where the detected APs are located is received within the preset time.

7. The terminal of claim 1, wherein the first positioning server is a server having an AP database including location information and inherent information related to APs collected by the operating system provider providing an operating system of the mobile terminal, and wherein the second positioning server is a server having an AP database including location information and inherent information related to APs collected by the manufacturer of the mobile terminal.

8. The terminal of claim 1, wherein the memory further stores information in which one of the first positioning method, the second positioning method, a third positioning method of acquiring one of location information according to results of simultaneously performing the first and second positioning methods, and a fourth positioning method of first performing the second positioning method for a preset time and acquiring the location information on the mobile terminal according to the first positioning method when the location information is not acquired within the preset time is set to correspond to each area, and wherein the controller identifies an area where the mobile terminal is located when the located area of the mobile terminal changes, and changes a network positioning method of the mobile terminal based on the information related to the positioning method set for each area and the identification result.

9. The terminal of claim 8, wherein the controller detects the change in the located area of the mobile terminal and identifies the located area of the mobile terminal, based on location information acquired by a global positioning system (GPS) positioning method.

10. The terminal of claim 8, wherein the controller determines the change in the located area of the mobile terminal according to occurrence or non-occurrence of overseas roaming of the mobile terminal, and wherein the controller identifies the located area of the mobile terminal based on a public land mobile network (PLMN) ID received from a visited network accessed in response to the overseas roaming when the overseas roaming occurs.

11. The terminal of claim 8, wherein the controller determines the change in the located area of the mobile terminal according to occurrence or non-occurrence of overseas roaming of the mobile terminal, and wherein the controller identifies the located area of the mobile terminal from a string of a message for notifying the occurrence of the overseas roaming to a user when the overseas roaming occurs.

12. The terminal of claim 8, wherein the controller decides one of the second positioning method or the fourth positioning method as the network positioning method of the mobile terminal when the mobile terminal is located in a specific area according to the identification result of the located area of the mobile terminal, and wherein the controller decides one of the first positioning method or the third positioning method as the network positioning method of the mobile terminal when the mobile terminal is located in an area other than the specific area.

13. A method for controlling a mobile terminal, the method comprising:

sensing a terminal location acquisition request from an application of the mobile terminal;

detecting APs adjacent to the mobile terminal, sensing wireless signals transmitted from the detected APs, respectively, and acquiring an intensity of each of the wireless signals;

starting a positioning process according to a second positioning method using the intensity of each of the wireless signals;

executing positioning using the second positioning method and checking whether or not a preset time has elapsed;

when the preset time has elapsed, sensing wireless signals transmitted from the detected APs, respectively, and detecting the location of the mobile terminal according to the first positioning method; and when the preset time has not elapsed, transmitting the location information obtained according to a result received from the second positioning method, wherein in the first positioning method, an operating system provider provides an AP database for the detecting of APs adjacent to the mobile terminal, wherein in the second positioning method, a manufacturer of the mobile terminal provides the AP database for the detecting of APs adjacent to the mobile terminal, wherein the second positioning method includes receiving prestored second AP information including location information related to the detected APs and other APs located within a predetermined area where the detected APs are located from a preset second positioning server for a preset time, and acquiring the location information on the mobile terminal based on the second AP information, and wherein the first positioning method includes receiving the location information related to the detected APs from a preset first positioning server and acquiring the location information on the mobile terminal based on the received location information when the location information has not been acquired according to the detection result.

14. The method of claim 13, wherein the second positioning method comprises:

detecting whether or not the prestored second AP information includes the location information related to the detected APs; and receiving new second AP information further including the location information related to the other APs within a predetermined area where the detected APs are located from the second positioning server according to the detection result, and wherein the determining whether the preset time has elapsed further comprises:

determining that the location information has been acquired for the preset time according to whether or not the prestored second AP information includes the location information related to the detected APs or whether or not the new second AP information has been received for the preset time.

15. The method of claim 13, further comprising, prior to detecting the APs adjacent to the mobile terminal:

identifying an area according to the location of the mobile terminal; and changing the network positioning method of the mobile terminal, according to the identified area, into one of the first positioning method, the second positioning method, a third positioning method of acquiring one of the location information according to results of simultaneously performing the first and second positioning methods, and a fourth positioning method including detecting the APs, acquiring the location information according to the second positioning method, detecting whether or not the location information has been acquired for the preset time, and acquiring the location information by the first positioning method according to the detection result.

* * * * *